United States Patent
Alghamdi et al.

(10) Patent No.: US 11,788,392 B2
(45) Date of Patent: Oct. 17, 2023

(54) DOWN-HOLE SELECTIVE ION REMOVAL WATER IONIZER SYSTEM FOR SUBSURFACE APPLICATIONS

(71) Applicant: SAUDI ARABIAN OIL COMPANY, Dhahran (SA)

(72) Inventors: Amani O. Alghamdi, Dhahran (SA); Subhash C. Ayirala, Dhahran (SA); Ali Abdallah Alyousef, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 371 days.

(21) Appl. No.: 17/232,838

(22) Filed: Apr. 16, 2021

(65) Prior Publication Data

US 2022/0332607 A1 Oct. 20, 2022

(51) Int. Cl.
*E21B 43/20* (2006.01)
*E21B 41/00* (2006.01)
(Continued)

(52) U.S. Cl.
CPC .............. *E21B 43/20* (2013.01); *B01D 61/027* (2013.01); *B01D 61/04* (2013.01); *C02F 1/442* (2013.01);
(Continued)

(58) Field of Classification Search
CPC .......... E21B 41/00; E21B 43/20; E21B 43/16; E21B 43/00; E21B 43/28; B01D 2311/04;
(Continued)

(56) References Cited

U.S. PATENT DOCUMENTS 1,784,214 A    12/1930 Workman
3,783,943 A *  1/1974 Schievelbein ........ C02F 1/4674
                                                166/266
(Continued)

FOREIGN PATENT DOCUMENTS

WO    WO-2017039859 A1 *  3/2017 ........... B01D 61/022
WO    2017099878 A1  6/2017

OTHER PUBLICATIONS

International Search Report Issued in Corresponding Application No. PCT/US2022/024732, dated Jun. 13, 2022, 4 pages.
(Continued)

*Primary Examiner* — Daniel P Stephenson
(74) *Attorney, Agent, or Firm* — Osha Bergman Watanabe & Burton LLP

(57) ABSTRACT

A method for selectively optimizing water chemistry within a wellbore may include positioning a system tubing in the wellbore. The system tubing may include an electrochemical cell, a first chamber, and a second chamber. The method may also include injecting a fluid into the electrochemical cell and directing an electrical current into the electrochemical cell wherein the fluid separates by charge into a first fluid and a second fluid. The method may also include passing the first fluid into the first chamber and the second fluid into the second chamber. Also, the method may include rotating the system tubing, wherein the first fluid flows from the first chamber to the wellbore through a first radial conduit and the second fluid flows from the second chamber to the wellbore through a second radial conduit.

22 Claims, 4 Drawing Sheets

(51) Int. Cl.
  *B01D 61/02* (2006.01)
  *B01D 61/04* (2006.01)
  *C02F 1/44* (2023.01)
  *C02F 1/461* (2023.01)

(52) U.S. Cl.
  CPC ........ *C02F 1/4618* (2013.01); *C02F 1/46109* (2013.01); *E21B 41/00* (2013.01); *B01D 2311/04* (2013.01); *B01D 2311/2684* (2013.01); *C02F 2001/46133* (2013.01); *C02F 2201/005* (2013.01); *C02F 2201/4611* (2013.01); *C02F 2201/4617* (2013.01); *C02F 2201/46115* (2013.01); *C02F 2201/46145* (2013.01)

(58) Field of Classification Search
  CPC .......... B01D 2311/2684; B01D 61/027; B01D 61/04; C02F 1/442; C02F 1/46109; C02F 1/4618; C02F 2001/46133; C02F 2201/005; C02F 2201/4611; C02F 2201/46115; C02F 2201/46145; C02F 2201/4617; C02F 1/461; C02F 2201/46
  See application file for complete search history.

(56) References Cited

U.S. PATENT DOCUMENTS

| | | | | |
|---|---|---|---|---|
| 4,553,593 | A * | 11/1985 | Shaw | C09K 8/584 507/225 |
| 5,452,763 | A * | 9/1995 | Owen | E21B 43/263 204/278 |
| 6,877,556 | B2 | 4/2005 | Wittle et al. | |
| 8,333,883 | B2 | 12/2012 | Peters et al. | |
| 9,725,986 | B2 * | 8/2017 | Xu | C09K 8/605 |
| 9,856,700 | B2 | 1/2018 | Randall et al. | |
| 10,060,240 | B2 | 8/2018 | Friesen et al. | |
| 11,522,177 | B2 * | 12/2022 | Wang | H01M 50/105 |
| 2008/0115930 | A1 | 5/2008 | Peters et al. | |
| 2008/0200355 | A1 * | 8/2008 | Emmons | C02F 1/4618 700/271 |
| 2009/0062156 | A1 * | 3/2009 | Wilson | C09K 8/665 507/211 |
| 2009/0159501 | A1 | 6/2009 | Greaney et al. | |
| 2011/0192593 | A1 | 8/2011 | Roddy et al. | |
| 2012/0125604 | A1 * | 5/2012 | Willingham | C09K 8/58 166/270.1 |
| 2013/0014952 | A1 | 1/2013 | Hopkins et al. | |
| 2013/0020079 | A1 * | 1/2013 | Hopkins | C02F 1/4618 166/308.1 |
| 2013/0105174 | A1 * | 5/2013 | Noui-Mehidi | E21B 43/122 166/372 |
| 2017/0260067 | A1 | 9/2017 | Hopkins et al. | |
| 2019/0169969 | A1 | 6/2019 | Al-Mulhem et al. | |
| 2022/0065084 | A1 * | 3/2022 | Al-Qasim | E21B 43/20 |
| 2022/0332607 | A1 * | 10/2022 | Alghamdi | B01D 61/027 |

OTHER PUBLICATIONS

Written Opinion Issued in Corresponding Application No. PCT/US2022/024732, dated Jun. 13, 2022, 6 pages.

Alghamdi, Amani O. et al., "Electro-kinetic induced wettability alteration in carbonates: Tailored water chemistry and alkali effects", Colloids and Surfaces A, ScienceDirect, Elsevier B.V., vol. 583, No. 123887, Aug. 2019, pp. 1-11 (11 pages).

Ayirala, S.C. and A.A. Yousef, "A State-of-the-Art Review to Develop Injection-Water-Chemistry Requirement Guidelines for IOR/EOR Projects", SPE Production & Operations, Society of Petroleum Engineers, Feb. 2015, pp. 26-42 (17 pages).

Cheng, Wei et al., "Selective removal of divalent cations by polyelectrolyte multilayer nanofiltration membrane: Role of polyelectrolyte charge, ion size, and ionic strenght", Journal of Membrane Science, ScienceDirect, Elsevier B.V., vol. 559, Apr. 2018, pp. 98-106 (9 pages).

"FilmTecTM SR90", FilmTecTM Nanofiltration 8 Elements, Dupont, Access Date: Apr. 15, 2021, URL: <https://www.dupont.com/products/filmtecsr90.html> (2 pages).

Kim, Joonhyeon et al., "Controlling ion transport with pattern structures on ion exchange membranes in electrodialysis", Desalination, ScienceDirect, Elsevier B.V., vol. 499, No. 114801, 2021, pp. 1-10 (10 pages).

Liang, Tianbo et al., "Formation Damage due to Drilling and Fracturing Fluids and Its Solution for Tight Naturally Fractured Sandstone Reservoirs", Geofluids, Hindawi, vol. 2017, Article ID 9350967, Dec. 2017, pp. 1-9 (9 pages).

McCosh, K. et al., "Continuous Improvement in Slop-Mud Treatment Technology", SPE Drilling & Completion, Society of Petroleum Engineers, Sep. 2009, pp. 418-423 (6 pages).

Wang, Xiaoyao et al., "Anion exchange membranes with excellent monovalent anion perm-selectiity for electrodialysis applications", Chemical Engineering Research and Design, ScienceDirect, Elsevier B.V., vol. 158, Apr. 2020, pp. 24-32 (9 pages).

* cited by examiner

DOWN-HOLE SELECTIVE ION REMOVAL WATER IONIZER SYSTEM FOR SUBSURFACE APPLICATIONS

BACKGROUND

Enhanced oil recovery (EOR) enables the extraction of hydrocarbon reserves that may be otherwise inaccessible. Water injection is a EOR technique used to improve oil recovery by, for example, improving the wettability of the oil-bearing formation and reducing the surface tension of the hydrocarbon reserves by reducing the interfacial tension (IFT) within the reservoir. In some water injection applications, an aqueous fluid is introduced into a reservoir to encourage native oil production.

Water injection may be used to support reservoir pressure, referred to as secondary mode. Water injection may also be used in a tertiary mode in which the salinity, pH, and ionic composition of the injected fluid may impact the recovery in the reservoir formations, such as carbonate and sandstone formations. For example, near neutral pH, low salinity water with a mix of $SO_4^{2-}$, $Ca^{+2}$, $Mg^{+2}$ ions may affect wetting, interfacial tension (IFT), and recovery of residual oil in carbonate reservoirs. In another example, water injection applications may use alkaline water where the $SO_4$-rich water may alter the reservoir wettability to favorably impact recovery for carbonates.

In other subsurface applications, acidic water containing certain ions and chemicals may be injected into a reservoir to stimulate the near wellbore regions and remove damage caused by drilling operations, such as the presence of solid blockages and mud filtrate. Acidic water injection applications may also address the lack of permeability in near wellbore regions caused by perforating debris by removing the blockages. In other applications, a neutral pH water injection with a mix of mostly $Na^+$ and $Cl^-$ ions (without sulfates and divalent cations) may be useful in mitigating scaling in tight carbonates and avoid scaling/souring in offshore sandstone reservoirs.

The success of water injection applications may be governed by the chemistry, salinity, and pH of the injection fluid. Conventional injection fluid preparation techniques may be cost and resource prohibitive, such as requiring access to fresh water and expensive infrastructure to support injection fluid preparation.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a system for selectively optimizing water chemistry within a wellbore. The system may include a tubular segment defining an interior chamber, configured to contain an electrochemical cell, a first chamber, and a second chamber. The tubular segment may be configured to rotate along a longitudinal axis. The electrochemical cell may include an anode and a cathode configured to receive power from a power source, and an electrical diffuser disposed between the anode and the cathode. The electrical diffuser may define an anode cell and a cathode cell wherein the electrical diffuser may be configured to be permeable. The first chamber may be configured to receive fluid from the anode cell though a first conduit. The first chamber may include a first radial conduit in fluid communication with the wellbore and a first axial conduit in fluid communication with the interior chamber. The second chamber may be configured to receive fluid from the cathode cell through a second conduit. The second chamber may include a second radial conduit in fluid communication with the wellbore and a second axial conduit in fluid communication with the interior chamber. The system may also include at least one ionic selective membrane, wherein the ionic selective membrane may be configured to extend diametrically across at least one of the first conduit, the second conduit, the first radial conduit, the first axial conduit, the second radial conduit or the second axial conduit. The system may also include a mechanical motor configured to rotate the tubular segment within the wellbore.

In another aspect, embodiments disclosed herein relate to a method for selectively optimizing water chemistry within a wellbore. The method may include positioning a system tubing in the wellbore. The system tubing may include an electrochemical cell, a first chamber, and a second chamber. The method may also include injecting a fluid into the electrochemical cell and directing an electrical current into the electrochemical cell wherein the fluid separates by charge into a first fluid and a second fluid. The method may also include passing the first fluid into the first chamber and the second fluid into the second chamber. Also, the method may include rotating the system tubing, wherein the first fluid flows from the first chamber to the wellbore though a first radial conduit and the second fluid flows from the second chamber to the wellbore through a second radial conduit.

In another aspect, embodiments disclosed herein relate to another method for selectively optimizing water chemistry within a wellbore. The method may include positioning an interior chamber within the wellbore and positioning an electrochemical cell within the interior chamber. The electrochemical cell may include an anode, a cathode, and an electrical diffuser. The electrical diffuser may be permeable and may be disposed between the anode and cathode. The electrical diffuser may be configured to extend across the electrochemical cell to thereby separate the electrochemical cell into an anode cell and a cathode cell. The method may also include positioning a first chamber and a second chamber within the interior chamber. The first chamber may include a first radial conduit coupled with a first radial valve and a first axial conduit coupled with a first axial valve. The second chamber may include a second radial conduit coupled with a second radial valve and a second axial conduit coupled with a second axial valve. The first chamber may be in fluid communication with the anode cell by an anode conduit and the second chamber may be in fluid communication with the cathode cell by a cathode conduit. The anode conduit may include an anode valve and the cathode conduit may include a cathode valve. The method may also include injecting a fluid into the electrochemical cell and powering the anode and the cathode in the presence of the fluid and thereby producing an anionic enriched fluid in the anode cell and a cationic enriched fluid in the cathode cell. The method may also include opening the anode valve and the cathode valve, wherein the anionic enriched fluid flows into the first chamber through the anode conduit and the cationic enriched fluid flows into the second chamber through the cathode conduit. Also, the method may include opening the first axial valve and the second axial valve, wherein the anionic fluid flows through the first axial conduit and the cationic fluid flows through the second axial conduit. The method may also include rotating the interior chamber, wherein the anionic enriched fluid flows through the first radial conduit into the wellbore and the cationic enriched fluid flows through the second radial conduit into the wellbore.

Other aspects and advantages of the claimed subject matter will be apparent from the following description and the appended claims.

DETAILED DESCRIPTION

Figure 1:
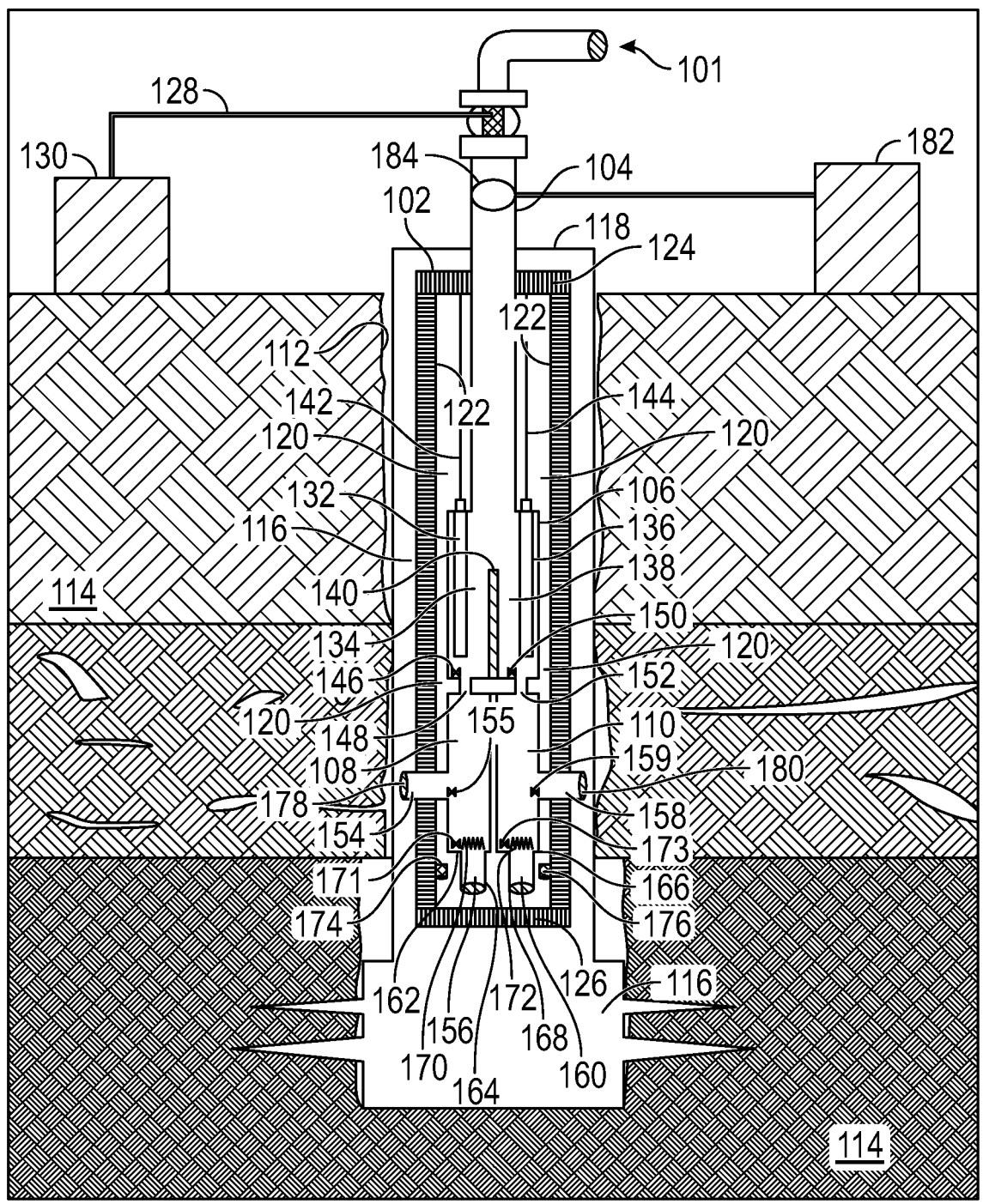
FIG. 1 shows a tool designed for a downhole environment for the extraction of hydrocarbons from a formation in accordance with one or more embodiments of the present disclosure.

According to embodiments of the present disclosure, the term "membrane" as used herein may include a wide variety of membrane material, including ionic selective membrane filters, ionic selective nanostructures, and similar selective membranes configured to filter target compositions.

One or more embodiments disclosed herein relate generally to systems and methods for selectively processing an injection fluid in a downhole environment. Embodiments of the present disclosure may include systems and methods configured to process a fluid in an electrochemical cell and selectively filter the fluid to achieve a target chemistry, salinity, and pH in wherein the fluid may be injected into a surrounding reservoir.

Embodiments of the present disclosure may include systems and methods for preparing a fluid to achieve a target chemistry, salinity, and pH for injection into a surrounding reservoir. The fluid may be sequentially processed in at least the following three operations: (i) an electrochemical cell operation wherein the fluid may be separated according to charge, (ii) an ionic selective membrane filtration operation wherein ions may be filtered through an ionic selective membrane, and (iii) a rotational mixing operation wherein the fluid output is injected into the surrounding reservoir via forces induced by rotating the downhole system. In embodiments of the present disclosure, the three operations may be performed simultaneously and in a sequential manner. In embodiments of the present disclosure, an operation may be provided enough time to reach equilibrium, particularly, equilibrium in the electrochemical cell. An operation may also be provided enough time for completion of filtrations and disposal of fluid, particularly in the ionic selective membrane operation.

Extraction of subterranean hydrocarbons from reservoirs through water injection, or waterflooding, techniques may improve the recovery rates of the hydrocarbons. The fluid used in water injection may be a water-based, or aqueous fluid, wherein the fluid may possess an ionic composition, salinity, and pH determined to enhance overall hydrocarbon recovery for a given injection application. The target chemistry of the injection fluid may depend on the application. For example, waterflooding techniques may include alkali flooding to alter the wettability of the oil-bearing reservoir, lower the IFT, induce oil-swelling and other divergent mechanisms to thereby improve oil recovery. In alkali flooding, an alkali (e.g., an ionic salt) may be used to react with the acidic rock chemistry wherein the alkali-oil chemistry in the reservoir lowers the IFT and emulsifies the crude oil. Depending on the mineralogy of the reservoir rock, the alkali may interact with the rock via surface exchange and hydrolysis, congruent and incongruent dissolution reactions, and insoluble salt formation. Alkalis used in in alkali flooding applications may include sodium metaborate ($NaBO_2$), sodium carbonate ($Na_2CO_3$), sodium hydroxide (NaOH), and sodium bicarbonate ($NaHCO_3$). The selection of alkali to be used may be dependent on the type of formation, clay and mineral content, and the presence of divalent cations.

Surfactant flooding applications may also be used to mobilize residual oil trapped in a reservoir by altering the fluid/fluid interaction by reducing the IFT of oil and brine (from secondary recovery) and altering the wettability of the porous reservoir. Particularly, carbonate reservoirs are conventionally injected with cationic surfactants while sandstone reservoirs are treated with anionic surfactants because of the likeness of the cationic and anionic charge to the respective reservoir rock system. In carbonate reservoirs, the negatively charged organic components of crude oil may adsorb on the positively charged mineral surfaces of the rock pores. For example, injecting cationic surfactants into a reservoir induces ion-pair formation interactions between the monomer of the surfactant and anionic components of oil adsorbed on the rock surfaces from the crude oil. Thereafter, adsorbed material at the rock surface is desorbed from the rock, water imbibition may occur and oil may be ejected out of the core material.

The success of a given subterranean injection operation may heavily depend on the chemistry of the injection fluid. Embodiments of the present disclosure may prepare a fluid to achieve a target composition, salinity, and pH for a given injection application in a downhole tool. The downhole tool of embodiments of the present disclosure may be configured to process the fluid in an electrochemical cell, wherein the fluid may be separated by charge into an anionic enriched fluid and cationic enriched fluid. The anionic enriched fluid and cationic enriched fluid may be filtered through ionic selective membrane filters wherein the fluids may be sent to the surface for further treatment or may be injected into the surrounding reservoir via rotational forces.

FIG. 1 shows an overall EOR water injection system 100, including downhole and surface elements, for the extraction of hydrocarbons in a hydrocarbon-bearing reservoir 114 in accordance with one or more embodiments of the present disclosure. The EOR water injection system 100 is shown positioned in a wellbore 112 within the reservoir 114. The wellbore 112 includes a wellbore wall 118 to provide at least a partial barrier between the reservoir 114 and a wellbore annulus 116 within the wellbore 112. Also shown in FIG. 1 is tubing 102 comprising a radial wall 122, a first axial wall 124, and a second axial wall 126. The tubing 102 is shown configured with a system annulus 120 where fluid may flow (arrows) through the system annulus 120 towards the surface.

As shown in FIG. 1, a system feed 101 is shown coupled with a system tubing 104 positioned in the wellbore 112. The system feed 101 may feed a fluid (not shown), such as saline or brine, through system tubing 104 and into an electrochemical cell 106. The fluid may come from a variety of fluid sources, including a natural resource or it may be produced in an ancillary operation. The fluid flowing from the system feed 101 may be contained in the electrochemical cell 106, where it may be separated by charge in an electrochemical reaction described herein.

Electrochemical Cell

Embodiments of the present disclosure may include an electrochemical cell positioned downhole wherein a fluid contained therein may be separated according to ionic charge. As shown in FIG. 1, the electrochemical cell 106 is shown in fluid communication with system tubing 104. The electrochemical cell 106 may include an anode 132, a cathode 136, and an electrical diffuser 140. The electrical diffuser 140 may be disposed between the anode 132 and cathode 136, thereby defining an anode cell 134 and a cathode cell 138.

Embodiments of the present disclosure may include a galvanic cell configuration positioned downhole, wherein a fluid contained therein may be separated according to ionic charge. Galvanic cell configurations of embodiments of the present disclosure may convert energy released by spontaneous redox reactions into electrical energy, thus alleviating the need for a separate power source.

Figure 2:
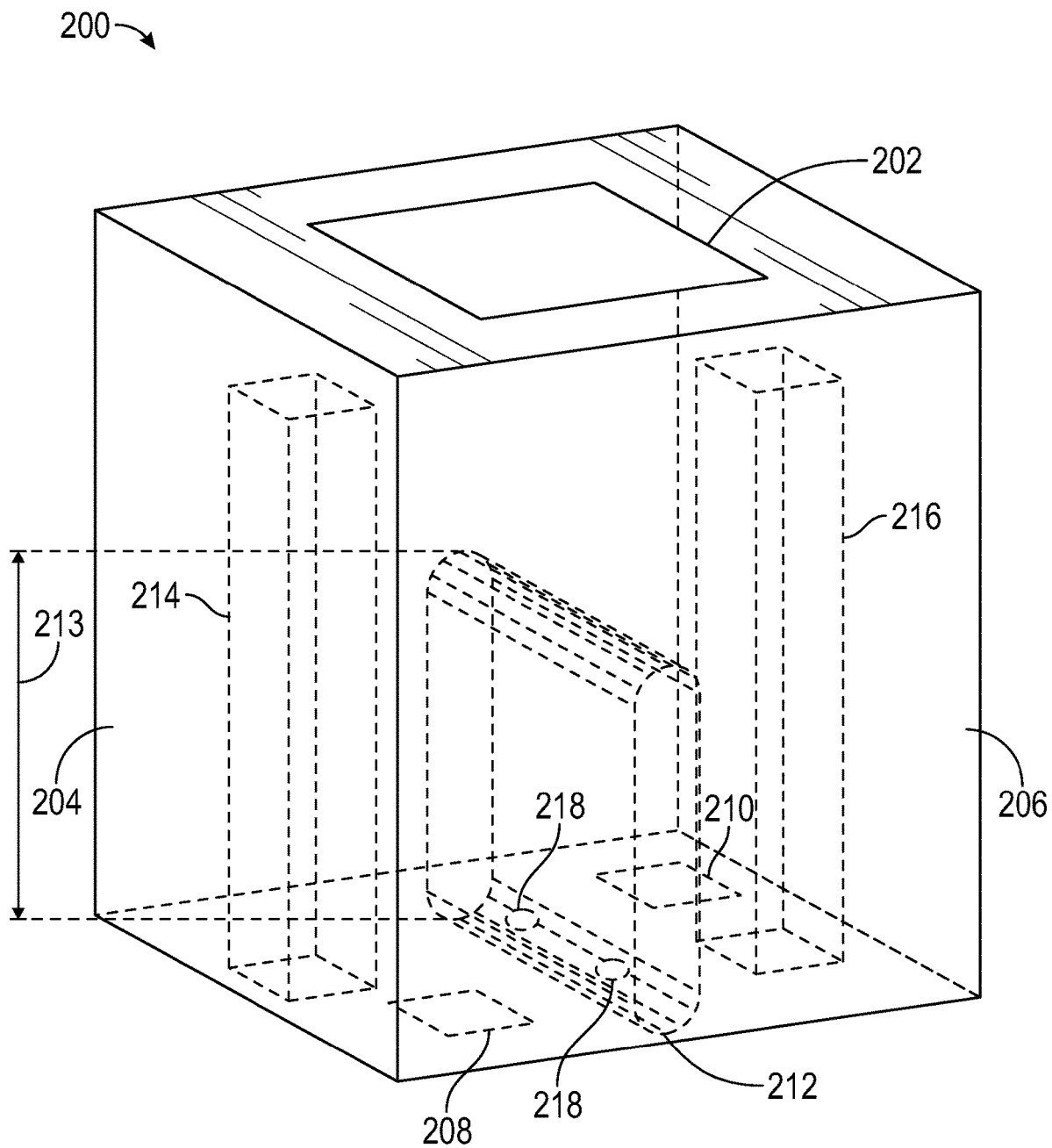
FIG. 2 shows an electrochemical cell in accordance with one or more embodiments of the present disclosure.

Referring to FIG. 2, FIG. 2 shows an illustration of an electrochemical cell 200 in accordance with one or more embodiments of the present disclosure. The electrochemical cell 200 is shown with an anode 214, a cathode 216, and an electrical diffuser 212 with height 213. The electrical diffuser 212 may at least partially separate the electrochemical cell 200 into two spaces, an anode cell 204 proximate to the anode 214 side of the electrical diffuser 212 and a cathode cell 206 proximate to the cathode 216 side of the electrical diffuser 212. A fluid may be fed into inlet 202 and may fill the electrochemical cell 200 up to the height 213 of the electrical diffuser 212 as outlet 208 and outlet 210 remain closed. As shown in FIG. 2, the electrical diffuser 212 may be mounted to the electrochemical cell 200 via connection mechanisms, such as screws 218.

The shape of the electrochemical cell 200 is shown as a cubic shape, however the dimensions of the electrochemical cell in accordance with embodiments of the present disclosure may be a variety of dimensions wherein the electrochemical cell may be positioned in a tubing, such as the system tubing 104 in FIG. 1.

Fluid Separation Based on Charge

In embodiments of the present disclosure, the electrochemical cell may separate a fluid contained therein based on charge by charging the anode and the cathode via a power source. As shown in FIG. 1, an electrical power conduit 128 coupled with a power source 130 may positively charge the anode 132 via power conduit 142 and negatively charge the cathode 136 via power conduit 144, wherein the power conduit 142 and power conduit 144 are coupled with the electrical power conduit 128. The anode 132 and cathode 136 may be solid structures composed of inert metal or metal alloys, such as platinum or iridium, wherein electrons may flow in the anode 132 and cathode 136 when coupled with a power source. The power source 130 may be a renewable energy source, such as solar energy like PV panels, wind, geothermal, hydropower, and nonrenewable source, like fossil fuel. The power source may also be a direct current (DC) power source. The potential difference applied (voltage) may be controlled to minimize energy lost through over-potential by monitoring the voltage efficiency during operation of the electrochemical cell (e.g., during electrolysis in the electrochemical cell).

In the electrochemical cell operation of embodiments of the present disclosure, the injected fluid separates based on change and may generate an acid enriched solution in the cathode cell and an alkaline enriched solution in the anode cell according to electrochemical reactions understood by those skilled in the art.

In embodiments of the present disclosure, fluid in the electrochemical cell may undergo electrolysis. In an electrolysis reaction, the fluid contained in the electrochemical cell may comprise negative and positive ions. Electrons may flow from the power source to the cathode, where the surrounding ions may undergo reduction, thus creating an acidic fluid (also referred to as cationic enriched fluid) surrounding the cathode within the cathode cell. Simultaneously, the ions in the anode may become oxidized and electrons may flow from the anode towards the power source, creating an alkaline fluid (also referred to as anionic enriched fluid) surrounding the anode within the anode cell.

Electrical Diffuser

As shown in FIG. 1, electrical diffuser 140 is shown disposed between the anode cell 134 and cathode cell 138 and may be configured to provide for movement of charged ions to the anode cell 134 (negatively charged ions) and the cathode cell 138 (positively charged ions). In embodiments of the present disclosure, the electrical diffuser may be configured to provide a permeable, flexible, non-durable and hydrophobic separation between the anionic enriched fluid contained in the anode cell and the cationic enriched fluid contained in the cathode cell, wherein the fluid may pass between the anode cell and cathode cell through the electrical diffuser. For example, an electrical diffuser may be composed of a permeable Teflon®. A structure connecting the electrical diffuser to the electrochemical cell, such as the screws 218 in FIG. 2, may be composed of the same or similar material as the electrical diffuser.

The electrical diffuser may be configured to adjust the volume of the anode cell and cathode cell as the anions and cations move through the electrical diffuser to the respective cell. When the anode and cathode become charged via the power source, the ions within the fluid may be attracted to the anode cell or cathode cell, depending on the ionic charge. The configuration of the electrical diffuser may facilitate ionic movement within the fluid between the anode cell and the cathode cell, where the position of the electrical diffuser between the anode cell and cathode cell may change depending on the ionic flow. For example, where there is a high concentration of anions in the cathode cell, the electrical diffuser may move towards the cathode as the anions flow away from the cathode, through the permeable electrical diffuser material, and in to the anode cell.

In some embodiments of the present disclosure, the electrical diffuser may be mounted to at least one wall of the electrochemical cell and allow for spontaneous movement of the electrical diffuser between the anode cell and the cathode cell. For example, in FIG. 1, the electrical diffuser 140 is shown connected to the bottom of the electrochemical cell 106. In embodiments where the electrical diffuser is statically attached to at least one wall of the electrical diffuser, the flow of the ions between the anode cell and the cathode cell may induce the electrical diffuser to bend away from the ionic flow, while retaining a permeable barrier between the anode cell and the cathode cell.

In embodiments of the present disclosure, the electrical diffuser may be configured to determine fluid flow equilibrium between the fluid contained in the anode cell (i.e., anionic enriched fluid or alkaline fluid) and the fluid contained in the cathode cell (i.e., cationic enriched fluid or acidic fluid). Equilibrium may be observed by a static state of the electrical diffuser wherein the volume of cationic enriched fluid in the cathode cell and the volume of anionic enriched fluid in the anode remains stable. Sensors may also be used to detect an equilibrium state within the electrochemical cell. The sensors may be mounted to the electrical diffusor, the anode cell, or the cathode cell, or a combination of positions within the electrochemical cell.

In embodiments of the present disclosure, the electrochemical cell process may be complete when the fluid movement between the anode cell and cathode cell reaches equilibrium. Once the electrochemical cell reaches equilibrium, as indicated by the stability of the electrical diffuser or sensors mounted in the electrochemical cell, then the process may proceed to an ionic selective membrane filtration. If the system has not reached equilibrium, more time may be provided to apply voltage to the electrolysis process.

Ionic Selective Membrane Filtration

Referring to FIG. 1, an anode valve 146 and a cathode valve 150 may be configured to control the flow from the anode cell 134 to a first chamber 108 through an anode conduit 148 and the cathode cell 138 to a second chamber 110 through a cathode conduit 152. The valves may be controlled by an automatic or manual control system (not shown), wherein the opening of the anode valve 146 and cathode valve 150 may be triggered by the detection of an equilibrium state of the electrochemical cell 106. The anode valve 146 and the cathode valve 150 may open simultaneously by the control system or may open independently of each other.

In embodiments of the present disclosure, once the electrochemical cell reaches equilibrium, an anode valve may open wherein the anionic enriched fluid may flow from the anode cell to a first ion selection chamber ("first chamber") and a cathode valve may open wherein the cationic enriched fluid may flow from the cathode cell to a second ion selection chamber ("second chamber"). The anionic enriched fluid and cationic enriched fluid contained in the first chamber and the second chamber, respectively, may be filtered to reach a target chemistry by at least one ionic selection membrane filter.

In some embodiments of the present disclosure, the anode conduit (see anode conduit 148) or the cathode conduit (see cathode conduit 152), or both, may be configured to be coupled with an ionic selective membrane, wherein the ions in the respective fluids flowing through the respective conduit may be selectively filtered.

First Chamber: Ionic Selection of Anionic Enriched Fluid

FIG. 1 shows the anode conduit 148 coupled with the first chamber 108, wherein the first chamber 108 may be configured to contain an alkaline fluid. The first chamber 108 is shown coupled with two tubular conduits, a first radial conduit 154 and a first axial conduit 156. The first radial conduit 154 and the first axial conduit 156 may be configured to be coupled with an ionic selective membrane, wherein the ions in the anionic enriched fluid contained in the first chamber 108 may be selectively filtered from the fluid flowing through the respective conduit.

FIG. 1 shows an ionic selective membrane 170 coupled with the first axial conduit 156 positioned proximate to an outlet 162, wherein the first axial conduit 156 may be in fluid communication with the system annulus 120 through outlet 164. In embodiments of the present disclosure, the anionic enriched fluid contained in the first chamber may flow through the ionic selective membrane coupled with the first axial conduit, and into the system annulus wherein the fluid may flow towards the surface through the system annulus. In some embodiments, and as shown in FIG. 1, the fluid may flow towards the surface with the assistance of pumps, such as first pump 174 and second pump 176.

The first radial conduit 154 in FIG. 1 is shown in fluid communication with the wellbore annulus 116 via outlet 178, wherein the first radial conduit 154 passes through the radial wall 122. Although FIG. 1 does not show an ionic selective membrane positioned in first radial conduit 154, embodiments according to the present disclosure may include an ionic selective membrane coupled with the first radial conduit configured to filter fluid flowing through the first radial conduit into the wellbore annulus. In embodiments of the present disclosure, an anionic enriched fluid contained in the first chamber may flow through the first radial conduit, and into the wellbore annulus of the wellbore wherein it may be injected into the reservoir through the rotational operation described herein.

Second Chamber: Ionic Selection of Cationic Enriched Fluid

FIG. 1 also shows the cathode conduit 152 coupled with the second chamber 110, wherein the second chamber 110 may be configured to contain an acidic fluid. The second chamber 110 is shown coupled with two tubular conduits, a second radial conduit 158 and a second axial conduit 160. The second radial conduit 158 and the second axial conduit 160 may be configured to be coupled with an ionic selective membrane, wherein the ions in the cationic enriched fluid contained in the second chamber 110 may be selectively filtered from the fluid flowing through the respective conduit.

FIG. 1 shows an ionic selective membrane 172 coupled with the second axial conduit 160 positioned proximate to an outlet 166, wherein the second axial conduit 160 may be in fluid communication with system annulus 120 through outlet 168. In embodiments of the present disclosure, the cationic enriched fluid contained in the second chamber may flow through the ionic selective membrane coupled with the second axial conduit, and into the system annulus wherein the fluid may flow towards the surface through the system annulus. In some embodiments, and as shown in FIG. 1, the fluid may flow towards the surface with the assistance of pumps, such as first pump 174 and second pump 176.

The second radial conduit 158 in FIG. 1 is shown in fluid communication with the wellbore annulus 116 via outlet 180, wherein the second radial conduit 158 passes through the radial wall 122. Although FIG. 1 does not show an ionic selective membrane positioned in the second radial conduit 158, embodiments according to the present disclosure may include an ionic selective membrane coupled with the second radial conduit configured to filter fluid flowing through the second radial conduit into the wellbore annulus. In embodiments of the present disclosure, an cationic enriched fluid contained in the second chamber may flow through the second radial conduit, and into the wellbore annulus wherein it may be injected into the reservoir through the rotational operation described herein.

Ionic Selective Membranes

As previously discussed, FIG. 1 illustrates the first radial conduit 154, the first axial conduit 156, the second radial conduit 158, and the second axial conduit 160 configured to be coupled with an ionic selective membrane. FIG. 1 shows ionic selective membrane 170 coupled with first axial conduit 156 and ionic selective membrane 172 coupled with second axial conduit 160. Although not shown in FIG. 1, some embodiments of the present disclosure may include an anode conduit (see anode conduit 148) or a cathode conduit (see cathode conduit 152), or both, configured to be coupled with an ionic selective membrane to filter the fluid flowing through the respective conduit to the respective chambers.

In embodiments of the present disclosure, ionic selective membranes may be useful in achieving a target composition of a fluid by filtering the fluid contained in the first chamber or the second chamber, or both, wherein the fluid contained in the chambers may pass through an ionic selective membrane positioned in the first radial conduit, first axial conduit, second radial conduit, or second axial conduit, or a combination of the conduits. The ionic selective membrane may be positioned in a conduit so that the ionic selective membrane may filter, or remove, a target ionic composition, or compositions, from the fluid flowing therethrough. The ionic selective membrane may extend diametrically across the respective conduit to ensure filtration of the fluid flowing through the conduit.

The ionic selective membranes may be exchangeable and may vary for each position. For example, if the target composition of an injection fluid changes, the ionic selective membrane may be exchanged for a different ionic selective membrane. The location of the ionic selective membrane may also be adjusted. For example, some applications of embodiments of the present disclosure may need to filter the anionic enriched fluid or cationic enriched fluid prior to returning, or recycling, the fluid to the surface through the axial conduits due to a change in fluid disposal requirements. This scenario may require positioning ionic selective membranes in the axial conduits to filter the ions from the fluid prior to the fluid flowing to the surface for disposal.

Filtration mechanisms of the ionic selective membranes may vary, and may include mechanical filtration, chemical filtration, or both. The ionic selective membranes may include nano-filtration membranes designed for specific subterranean applications. The nano-filtration membranes may have pore sizes ranging from 1-50 nanometer. The membranes may be composed of polymer thin films, such as polyethylene, or metals, such as aluminum. Embodiments of the present disclosure may include polyelectrolyte multilayer (PEM) nano-filtration membrane.

As previously discussed, the anionic enriched fluid in the first chamber may flow through first axial conduit, wherein it may also flow through an ionic selective membrane, and into the system annulus to the surface. Also, the cationic enriched fluid in the second chamber may flow through the second axial conduit, wherein it may also flow through an ionic selective membrane, and into the system annulus to the surface. As shown in FIG. 1, a first axial valve 171 and a second axial valve 173 may be configured to control fluid flow through the axial conduits (156, 160). A control system (not shown) may be configured to control the valve positions.

In FIG. 1, a first radial valve 155 is shown coupled with the first radial conduit 154 and a second radial valve 159 is shown coupled with the second radial conduit 158. The radial valves (155, 159) may be configured to control fluid flow through the respective radial conduits. In embodiments of the present disclosure, the first radial valve and the second radial valve may open when the first axial valve and the second axial valve close, thus directing fluid flow from the first chamber to the first radial conduit and fluid flow from the second chamber to the second radial conduit. A control system (not shown) may be configured to control the valve positions. In embodiments of the present disclosure, the anionic enriched fluid flowing through the first radial conduit and the cationic enriched fluid flowing through the second radial conduit may also be filtered through a respective ionic selection membrane prior to entering the wellbore annulus. In embodiments of the present disclosure, fluid entering the wellbore annulus, either from the first radial conduit or the second radial conduit, or both, may be mixed and injected into the surrounding reservoir via rotational mixing operation described herein.

FIG. 3 Summary

Figure 3:
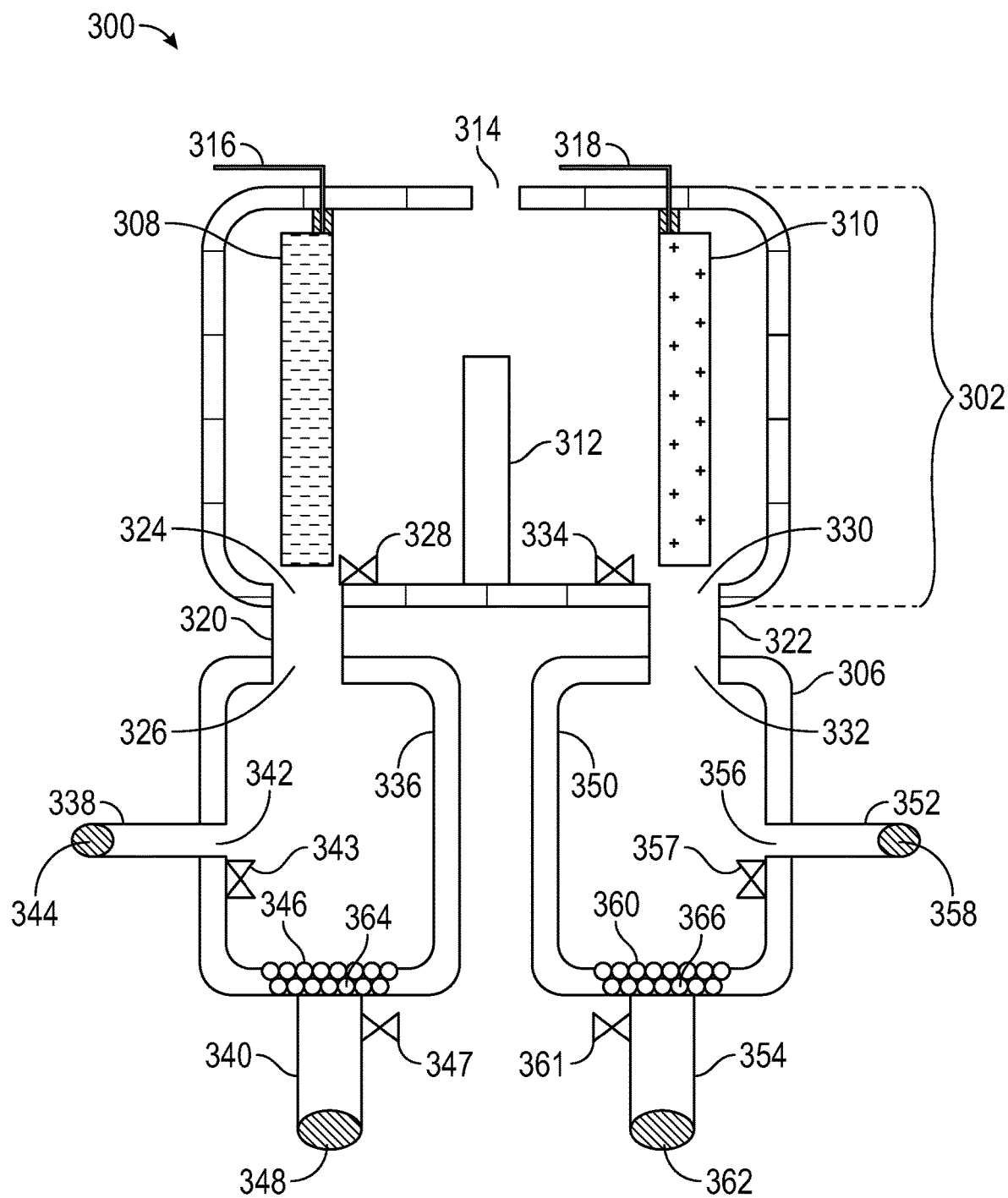
FIG. 3 shows a downhole selective ion removal ionization system according to one or more embodiments of the present disclosure.

FIG. 3 illustrates another view of a fluid processing system 300 similar to the electrochemical cell, first chamber and second chamber elements shown in FIG. 1 and according to embodiments of the present disclosure. The fluid processing system 300 is shown to include an electrochemical cell 302 comprising a fluid feed inlet 314, an anode 308 coupled with an anode power conduit 316, a cathode 310 coupled with a cathode power conduit 318, and an electrical diffuser 312. The electrochemical cell 302 is coupled with an anode conduit 320 comprising an anode conduit inlet 324, an anode valve 328, and an anode conduit outlet 326 in fluid communication with the interior 336 of a first chamber 304. The electrochemical cell 302 is also shown coupled with a cathode conduit 322 comprising a cathode conduit inlet 330, a cathode valve 334, and a cathode conduit outlet 332 in fluid communication with the interior 350 of a second chamber 306.

Continuing with FIG. 3, the first chamber 304 is shown comprising a first radial conduit 338 and first axial conduit 340. The first radial conduit 338 is shown comprising an inlet 342 and outlet 344, as well as coupled to first radial valve 343. The first axial conduit 340 is shown comprising an inlet 346 and an outlet 348, as well as coupled to a first axial valve 347 and an ionic selective membrane 364. The second chamber 306 is shown comprising a second radial conduit 352 and second axial conduit 354. The second radial conduit 352 is shown comprising an inlet 356 and outlet 358 as well as coupled to second radial valve 357. The second axial conduit 354 is shown comprising an inlet 360 and an outlet 362, as well as coupled to a second axial valve 361, and an ionic selective membrane 366.

Rotational Mixing

Embodiments of the present disclosure may include sequential processing of a fluid to achieve a target chemistry for a water injection application. A fluid may be separated by charge in an electrochemical cell into an anionic enriched fluid and an cationic enriched fluid. The anionic enriched fluid or cationic enriched fluid, or both, may be filtered prior to either flowing to the surface through the system annulus or flowing to the wellbore annulus for mixing and injecting into the surrounding reservoir via a rotational mixing operation.

FIG. 1 illustrates a rotational mixing configuration according to embodiments of the present disclosure. The system tubing 104 is shown extending above the wellbore 112, where it is coupled to a rotating motor 182 by a mechanical connection 184. The mechanical connection 184 may be configured to rotate the system tubing 104 along the longitudinal axis of the wellbore 112. The tubing 102 may be coupled with the system tubing 104 wherein the rotation of system tubing 104 may also rotate tubing 102 and the elements contained therein. The first radial conduit 154 and the second radial conduit 158 may be coupled to the tubing 102 so that when the tubing 102 and system tubing 104 rotate via the mechanical connection 184, the first radial conduit 154 and second radial conduit 158 also rotate around the longitudinal axis of the wellbore wall 118.

In embodiments of the present disclosure, at least a portion of a fluid contained in the first chamber, the second chamber, or both may pass through respective ionic selective membranes and radial conduits (see first radial conduit 154 and second radial conduit 158 in FIG. 1) and into the wellbore annulus (see wellbore annulus 116). In other embodiments, the fluid flowing into the wellbore annulus from the first radial conduit, second radial conduit, or both, may not pass through an ionic selective membrane, depending on the target chemistry of the injection fluid for a given injection application. As the fluid from at least one radial conduit enters the wellbore tubing, mixing of the fluid may occur when the rotating motor rotates the system tubing within the wellbore. The rotational movement (e.g., rotational momentum and speed) of the tubing, the system tubing, and the contents therein may be controlled via a control system.

In embodiments of the present disclosure, the rotational movement may induce a pressure pulsing effect inside the wellbore, particularly the wellbore annulus containing the injection fluid (i.e., the fluid flowing from the first radial conduit or the second radial conduit, or both). The pressure pulse effect induced by the pressure and rotation of the tubing may provide enough force for the fluid to penetrate a target injection zone of the reservoir through perforation by subterranean water injection mechanisms understood by those skilled in the art.

Embodiments of the present disclosure may be composed of material with properties able to withstand extreme conditions, including high pressure, high temperature, and high salinity conditions. For example, the tubing may be composed of carbon steel or other metallic or non-metallic material that can retain shape and integrity in high pressure, high temperature, and high salinity of surrounding environments both inside and outside the tubing. Embodiments of the present disclosure may be configured to control the temperature of the elements inside the tubing. For example, the tubing may be configured to allow for fluid, such as cooling water, to flow and cool the systems contained therein.

Method Embodiment: Saline Fluid Processing

In embodiments of the present disclosure, the electrochemical reaction may be the electrolysis of a saline fluid. The saline fluid may come from a variety of fluid sources, including a natural resource or saline produced in an ancillary operation. While electrolysis of a saline fluid may be discussed herein, it will be understood by those skilled in the art that fluids of varying compositions may be used in embodiments of the present disclosure depending on the application.

Figure 4:
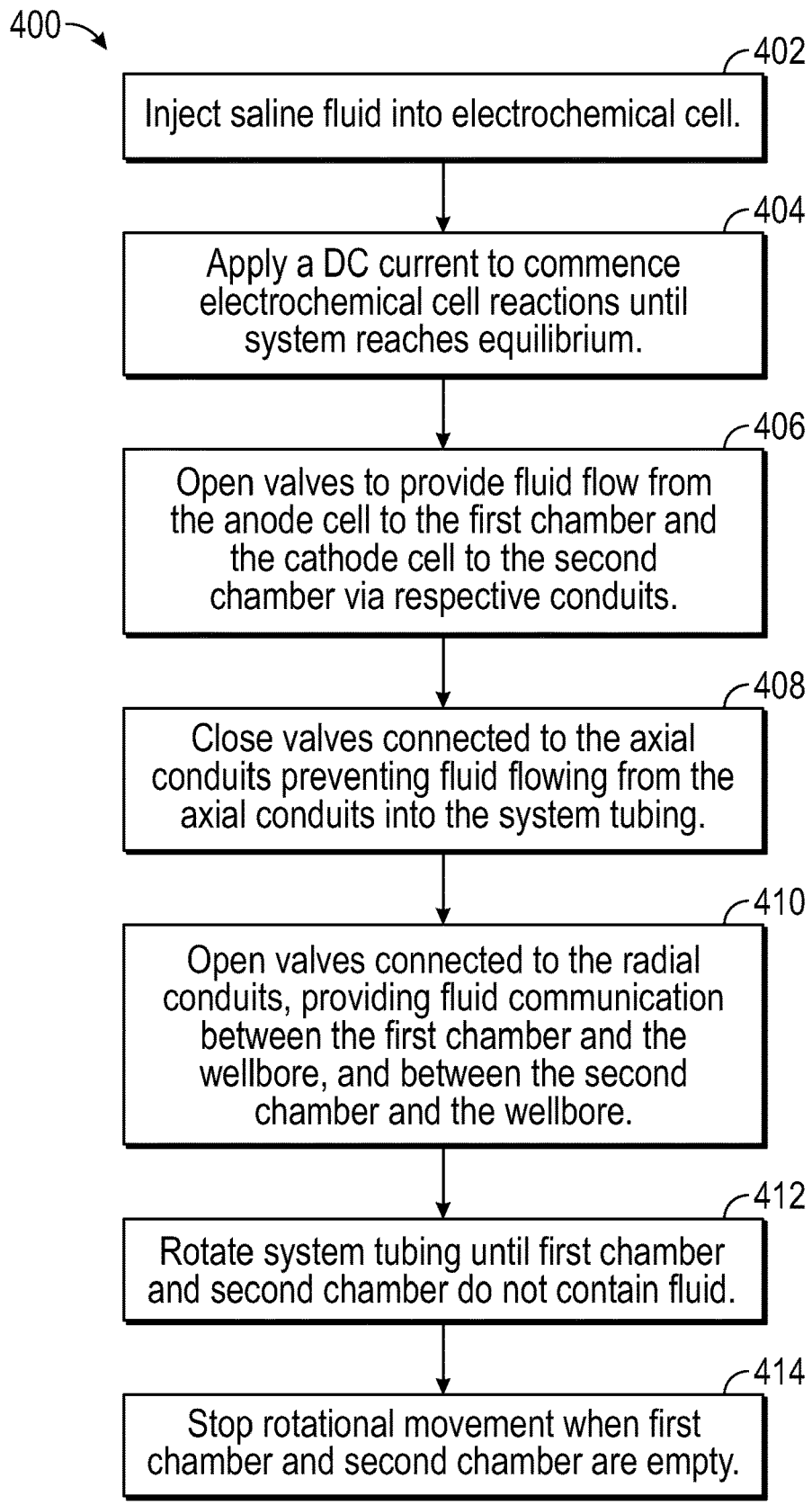
FIG. 4 shows a flowchart of a downhole selective ion removal method in accordance with one or more embodiments of the present disclosure.

FIG. 4 shows a flowchart describing methods for selective ion removal water ionizer of a saline feed to achieve a targeted subsurface application 400 in accordance with one or more embodiments of the present disclosure. It is to be understood that one or more of the steps shown in the flowchart may be omitted, repeated, or performed, or a combination thereof, in a different order than the order shown. Accordingly, the scope of the disclosure should not be considered limited to the specific arrangement of steps shown in the flowchart.

In step 402, a saline fluid may be injected into an electrochemical cell such as electrochemical cell 106 in FIG. 1. In step 404, a DC current may be applied to the anode and cathode configurations previously described. The saline fluid in the electrochemical cell may undergo electrolysis in the presence of the DC current. In the electrolysis reaction, electrons flow from the DC power source to the cathode, where the surrounding ions may undergo reduction, thus creating an cationic enriched fluid surrounding the cathode within the cathode cell. Simultaneously, the ions in the anode become oxidized and electrons flow from the anode towards the DC power source, creating an anionic enriched fluid surrounding the anode within the anode cell.

In embodiments of the present disclosure, the electrochemical cell operation is complete when the fluid movement between the anode cell and cathode cell reaches equilibrium. Once the system reaches equilibrium, as indicated by the stability of the electrical diffuser or sensors mounted in the electrochemical cell, then the process may proceed to step 406. If the system has not reached equilibrium, more time may be provided to apply voltage to the electrolysis process. Once the system reaches equilibrium, an anode valve and cathode valve may be opened wherein the anionic enriched fluid in the anode cell may flow to the first chamber and the cationic enriched fluid in the cathode cell may flow to the second chamber, as shown in step 406. The anionic enriched fluid flowing into the first chamber may flow through a first axial conduit and the acid fluid flowing into the second chamber may flow through a second axial conduit. In step 408, the valves connected to the axial conduits may be closed and, as shown in step 410, the valves connected to the radial conduits may be opened.

Embodiments of the present disclosure may operate in sequential batch operations. For example, step 406 may be complete when the fluids from the anode cell and cathode cell finish flowing into the first chamber and second chamber, respectively. Once the fluid exits the electrochemical cell, the anode valve and cathode valve may be closed, and step 402-406 may be repeated with a new batch of saline fluid.

As seen in step 412, the system tubing may be rotated within the wellbore via a rotating motor. The system tubing may be coupled with the tubing in the wellbore so that the rotation of the system tubing may also rotate the tubing. The radial conduits extending through the tubing into the wellbore annulus may also rotate via the rotation of the tubing and system tubing. The rotational movement may force the fluids in both the first and second chamber to flow through the radial conduits. The forces and pressure caused by the rotational movement may also mix the fluids flowing through both radial conduits in the wellbore. The mixed fluids may also be injected into the surrounding wellbore via pressure pulses created by the rotational movement of the system tubing. In step 414, the rotational movement is stopped at any point after the fluids are no longer contained in the first and second chamber. Once the mixed fluid of the first chamber and the second chamber flows into the wellbore annulus, system fluid feed inlet (see system feed 101 in FIG. 1) and radial conduit valves may be closed and pressure inside the wellbore may increase. The increase in pressure may also increase via pumps, wherein the fluid may enter the oil-bearing reservoir.

Selective Ionic Filtering Examples

Selective Ionic Filtering for Hydrocarbon Recovery

Embodiments of the present disclosure may be useful in a variety of downhole applications requiring target ionic compositions such as EOR in carbonate reservoirs. Desirable ionic compositions of an injection fluid for EOR in carbonate reservoirs may include $SO_4^{2-}$, $Ca^{+2}$, and $Mg^{+2}$. Injection fluid containing these ions may be used to improve reservoir wettability and enhance the production of oil-wet and mixed-wet regions in the reservoir. An ionic selective membrane, such as FilmTec™ SR90 may be positioned in the first axial conduit to selectively reduce the sulfate concentration from the fluid flowing to the surface (via axial conduits) by positioning an ionic selective membrane. This ionic selective membrane may block the sulfate ions in the fluid flowing through the first axial conduit, through the system annulus, and to the surface. The desired sulfate ions may remain in the fluid contained in the first chamber. In the same operation in the second chamber, a nanofiltration membrane, such as a PEM nano-filtration membrane, may be positioned in the second axial conduit to filter out divalent cations and provide passage of monovalent cations to the surface for further processing. The divalent cations may remain in the fluid contained in the second chamber. The fluid comprising a high concentration of the filtered divalent cations may then flow through the second radial conduit and into the wellbore annulus. The sulfate enriched fluid flowing through the first radial conduit from the first chamber may combine with the divalent cation enriched fluid flowing through the second radial conduit in the wellbore annulus. The two fluids may be subjected to simultaneous rotational movement of the rotational operation, where the fluids may mix in the wellbore annulus. The mixed fluid may be injected into the surrounding reservoir via the pressure pulse induced by the rotational mixing operation for hydrocarbon recovery. The chemistry of the mixture of the sulfate enriched fluid and the divalent cation enriched fluid may enhance sweep efficiency induced by the pressure pulse effect of the rotational mechanism.

Selective Ionic Filtering for Removal of Wellbore Damage

Embodiments of the present disclosure may also be useful in removal of wellbore damage due to drilling operations, such as blockages and clogs in the reservoir formation. Cationic enriched fluid rich in ions, such as $Na^+$, $Ca^{+2}$, and $Mg^{+2}$ may be injected into a reservoir to remove damage in perforations, such as blockages. In embodiments of the present disclosure, the first radial valve coupled with the first radial outlet may be closed, while the cationic enriched fluid from the second chamber may flow through the second radial conduit into the wellbore annulus where it may be injected into the reservoir by the pressure pulses of the rotational operation. In this scenario, the fluid injected into the reservoir may not be filtered through an ionic selective membrane. The anionic enriched fluid from the first chamber may be prevented from entering the wellbore with the cationic enriched fluid from the second chamber.

Selective Ionic Filtering for Scaling and Souring Mitigation

Embodiments of the present disclosure may be used to mitigate scaling in tight carbonates and scaling formation and souring in offshore sandstone reservoirs in a near-neutral pH where a fluid mixture comprising $Na^+$ and $Cl^-$ ions, free of sulfates, and divalent cations may be desirable. To achieve the target composition in this application, divalent cation membranes, such as PEM nanofiltration membrane, may be positioned in the second radial conduit. The acidic, cationic enriched fluid from the second chamber may flow through the membrane and the second radical conduit where it may exit as a monovalent ion rich brine. The monovalent rich brine may be injected into the reservoir using embodiments of the present disclosure. The remaining fluid contained in the second chamber may remain enriched with divalent cations where it is recycled to the surface through the second axial conduit. Ionic selective membranes, such as monovalent anions exchange membranes (e.g., C16-0.75-H120) may be positioned in the first radial conduit to filter the fluid contained in the first chamber. The fluid may then be mixed with the fluid from the second radial conduit and injected into the surrounding reservoir.

Advantages of the proposed invention include downhole modification of injection water, improved wettability in the reservoir pore spaces via the modified injected fluid, enhanced connectivity, and improved oil recovery and sweep efficiency induced by the pressure pulsing effect. The proposed invention may also be helpful to remove near wellbore damage by injecting the cationic enriched fluid and blocking the anionic enriched fluid from the proposed tool. The proposed invention may also mitigate scale formation and souring in sandstone and carbonate formations.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed:

1. A system for selectively optimizing water chemistry within a wellbore, the system comprising:
   an electrochemical cell configured for a downhole environment, wherein the electrochemical cell is configured to produce an anionic enriched fluid and a cationic enriched fluid;
   a first chamber configured to receive the anionic enriched fluid from the electrochemical cell and comprising at least a first radial conduit;
   a second chamber configured to receive the cationic enriched fluid from the electrochemical cell and comprising at least a second radial conduit;
   a tubing configured to contain at least the first chamber and second chamber, wherein the first radial conduit and the second radial conduit are configured to extend through the tubing into the wellbore, wherein the tubing is configured to rotate along a longitudinal axis of the wellbore.

2. The system according to claim 1, wherein the first chamber further comprises a first axial conduit in fluid communication with the tubing and the second chamber further comprises a second axial conduit in fluid communication with the tubing.

3. The system according to claim 1, further comprising an ionic selective membrane filter configured to filter at least the anionic enriched fluid or cationic enriched fluid.

4. The system according to claim 1, wherein the electrochemical cell further comprises an electrical diffuser disposed between the anionic enriched fluid and the cationic enriched fluid and defining an anode cell and a cathode cell.

5. A system for selectively optimizing water chemistry within a wellbore, the system comprising:
   a tubular segment defining an interior chamber configured to contain an electrochemical cell, a first chamber, and a second chamber, wherein the tubular segment is configured to rotate along a longitudinal axis, wherein
   the electrochemical cell comprises an anode and a cathode configured to receive power from a power source, an electrical diffuser disposed between the anode and the cathode defining an anode cell and a cathode cell wherein the electrical diffuser is configured to be permeable;

the first chamber configured to receive fluid from the anode cell though a first conduit, the first chamber comprising a first radial conduit in fluid communication with the wellbore and a first axial conduit in fluid communication with the interior chamber;

the second chamber configured to receive fluid from the cathode cell through a second conduit, the second chamber comprising a second radial conduit in fluid communication with the wellbore and a second axial conduit in fluid communication with the interior chamber;

at least one ionic selective membrane, wherein the ionic selective membrane is configured to extend diametrically across at least one of the first conduit, the second conduit, the first radial conduit, the first axial conduit, the second radial conduit or the second axial conduit; and, a mechanical motor configured to rotate the tubular segment within the wellbore.

6. The system according to claim 5, wherein the power source is a direct current power source.

7. The system according to claim 5, wherein the at least one ionic selective membrane is a nano filtration membrane.

8. The system according to claim 5, further comprising a sensor configured to detect an equilibrium state in the electrochemical cell.

9. The system according to claim 5, wherein the electrical diffuser is hydrophobic and flexible.

10. The system according to claim 5, wherein the electrical diffuser is configured to detect equilibrium in the electrochemical cell.

11. The system according to claim 5, wherein the anode and the cathode are composed of inert metals.

12. The system according to claim 5, wherein the first radial conduit further comprises a first radial valve and the second radial conduit further comprises a second radial valve.

13. The system according to claim 5, wherein the interior chamber comprises at least one pump configured to induce a fluid flow towards a surface.

14. The system according to claim 5, wherein the at least one ionic selective membrane is configured to output a fluid with a target salinity, composition, and pH.

15. A method for selectively optimizing water chemistry within a wellbore, the method comprising:

positioning a system tubing in the wellbore, the system tubing comprising an electrochemical cell, a first chamber, and a second chamber;

injecting a fluid into the electrochemical cell;

directing an electrical current into the electrochemical cell, wherein the fluid separates by charge into a first fluid and a second fluid;

passing the first fluid into the first chamber and the second fluid into the second chamber;

rotating the system tubing, wherein the first fluid flows from the first chamber to the wellbore though a first radial conduit and the second fluid flows from the second chamber to the wellbore through a second radial conduit.

16. The method according to claim 15, further comprising passing the first fluid in the first chamber through a first axial conduit and the second fluid in the second chamber through a second axial conduit.

17. The method according to claim 16, further comprising positioning at least one ionic selective membrane in the first radial conduit, the first axial conduit, the second radial conduit, or the second axial conduit.

18. The method according to claim 17, wherein the at least one ionic selective membrane outputs a fluid with a target salinity, composition, and pH.

19. A method for selectively optimizing water chemistry within a wellbore, the method comprising:

positioning an interior chamber within the wellbore, positioning an electrochemical cell within the interior chamber, wherein the electrochemical cell comprises an anode, a cathode, an electrical diffuser, wherein the electrical diffuser is permeable and is disposed between the anode and cathode, the electrical diffuser configured to extend across the electrochemical cell to thereby separate the electrochemical cell into an anode cell and a cathode cell;

positioning a first chamber and a second chamber within the interior chamber, the first chamber comprising a first radial conduit coupled with a first radial valve and a first axial conduit coupled with a first axial valve, and the second chamber comprising a second radial conduit coupled with a second radial valve and a second axial conduit coupled with a second axial valve, wherein the first chamber is in fluid communication with the anode cell by an anode conduit and the second chamber is in fluid communication with the cathode cell by a cathode conduit, the anode conduit comprising an anode valve and the cathode conduit comprising a cathode valve;

injecting a fluid into the electrochemical cell;

powering the anode and the cathode in the presence of the fluid and thereby producing an anionic enriched fluid in the anode cell and a cationic enriched fluid in the cathode cell, opening the anode valve and the cathode valve, wherein the anionic enriched fluid flows into the first chamber through the anode conduit and the cationic enriched fluid flows into the second chamber through the cathode conduit;

opening the first axial valve and the second axial valve, wherein the anionic fluid flows through the first axial conduit and the cationic fluid flows through the second axial conduit;

rotating the interior chamber, wherein the anionic enriched fluid flows through the first radial conduit into the wellbore and the cationic enriched fluid flows through the second radial conduit into the wellbore.

20. The method according to claim 19, wherein the fluid is an aqueous fluid.

21. The method according to claim 19, further comprising positioning at least one ionic selective membrane in at least the anode conduit, the cathode conduit, the first radial conduit, the second radial conduit, the first axial conduit, or the second axial conduit.

22. The method according to claim 21, wherein the at least one ionic selective membrane outputs a fluid with a target salinity, composition, and pH.

* * * * *